United States Patent [19]
LaRue

[11] 4,168,073
[45] Sep. 18, 1979

[54] GLASS ARTICLE HANDLING CHUCK

[75] Inventor: Daniel L. LaRue, Toledo, Ohio

[73] Assignee: Owens-Illinois, Inc., Toledo, Ohio

[21] Appl. No.: 882,522

[22] Filed: Mar. 1, 1978

[51] Int. Cl.² ............................................ B23B 31/40
[52] U.S. Cl. ................................. 279/2 R; 242/72 R
[58] Field of Search ........................... 279/2 R; 82/44; 242/72 R; 269/48.1

[56] References Cited
U.S. PATENT DOCUMENTS 3,463,499   8/1969   Mott et al. ............................ 279/2 R

*Primary Examiner*—Gil Weidenfeld
*Attorney, Agent, or Firm*—D. T. Innis; Myron E. Click; David H. Wilson

[57] ABSTRACT

A chuck for handling hollow, cylindrical glass articles, such as used in solar energy installations, is disclosed wherein such glass articles generally are in the form of concentrically assembled glass tubing having a coated exterior surface. In the orientation in handling these types of glass articles, a polypropylene, integral chucking mechanism, which is adapted to be inserted within the glass article and actuated after insertion, expands to engage the interior surface of the glass article and maintains the article in a specific, desired, fixed position. The inclusion of a cone member on the chuck supporting structure and a V block guide assist in the proper alignment of the glass article relative to the clamp and its support.

5 Claims, 5 Drawing Figures

GLASS ARTICLE HANDLING CHUCK

BACKGROUND OF THE INVENTION

The present invention is related to the art of handling, and specifically in one instance of providing a system for holding, a hollow glass member in a specific location relative to the central axis of the article so that other parts may be joined to or associated with the glass article. Frequently, it is necessary to hold the central-most element of a solar collector made of glass tubing in a manner that does not mar the external coating and permit the accurate but rapid telescoping of a larger diameter tube over the central one. When assembly of two or more tubes is to take place, the accurate placement of the center or "core" tube is essential for the assembly to be accomplished without the skill of a precision mechanic. Time also is a serious cost factor in any assembly operation and when an article of fairly complex nature as a solar collector can be produced with unskilled labor at a fairly fast rate the cost is such that the solar collector may be competitive with other sources of energy.

Another aspect of the present invention involves the transporting of glass containers by the use of an internal, neck-engaging chuck. The use of chucks for transporting containers has seen wide-spread use, particularly in the holding of containers through after-processing equipment, such as spray decorating or treating for purposes of rendering the container scratch-resistant. The use of chucks to hold containers by their necks is a desirable feature of many case packers and unpackers. The chuck should be positive in its gripping action and be made, from a material and construction standpoint, such that it has extended life and does not produce defects in the glassware.

SUMMARY OF THE INVENTION

An internal chuck for hollow glass articles in which an outwardly deflectable integral plastic member is carried at the end of a supporting tube with an actuating rod extending telescopically through the tube to then be connected to the extreme end of said deflectable member. Upon actuation of the member by a reciprocating motor connected to the rod, the member is deflected outwardly to grip the glass article within which the chuck is positioned. When the internal chuck is used to handle containers, it will be moved into the neck of the container, then actuated to deflect the member outwardly into contact with the internal shoulder of the container and result in raising the container from its support into contact with a predetermined, fixed, horizontal datum that engages the upper finish of the container. Release of the container is accomplished by deactivating the chuck.

DETAILED DESCRIPTION OF THE DRAWINGS

In the handling of hollow glass members, such as closed end pieces of tubing, when assembling the glass tubing with other cylindrical glass pieces, it is desirable that the glass tubing be held in such a manner that it is not touched exteriorally, particularly if the tubing has a light reflective or absorbtive coating covering the exterior surface, as is the case in the fabrication of some solar energy collectors.

In the present invention, a chuck, which is mounted on a rigid stand, has the glass article such as tubing, to be located and supported thereby moved relative to the chuck. When the glass tubing is in position, the chuck is actuated to fix the central axis of the hollow glass article such as tubing at a predetermined location.

Figure 5:
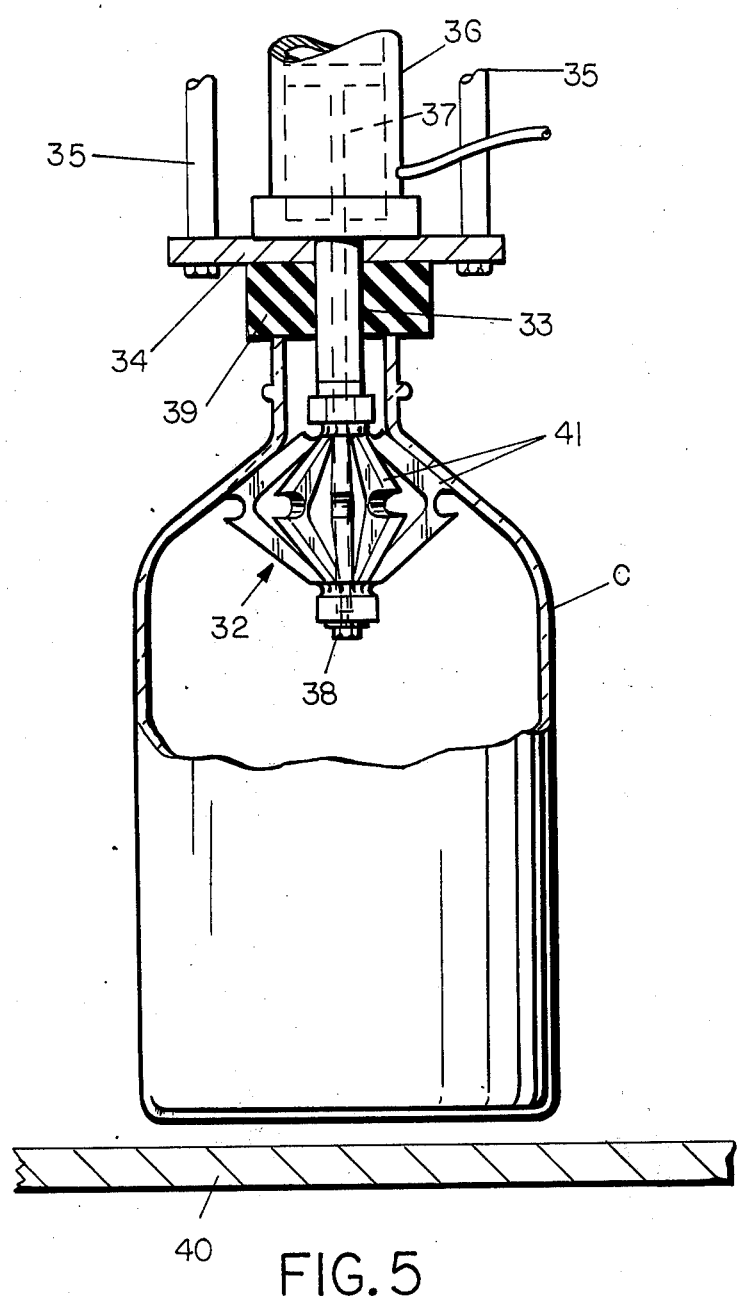
FIG. 5 is a cross-sectional view of a second embodiment of the apparatus of the invention for handling glass containers.

When the second embodiment of the apparatus of the invention, as illustrated in FIG. 5, is positioned within the neck of a glass container intermediate the shoulder thereof, and then actuated, the container will actually be lifted from the surface upon which it is resting.

Figure 1:
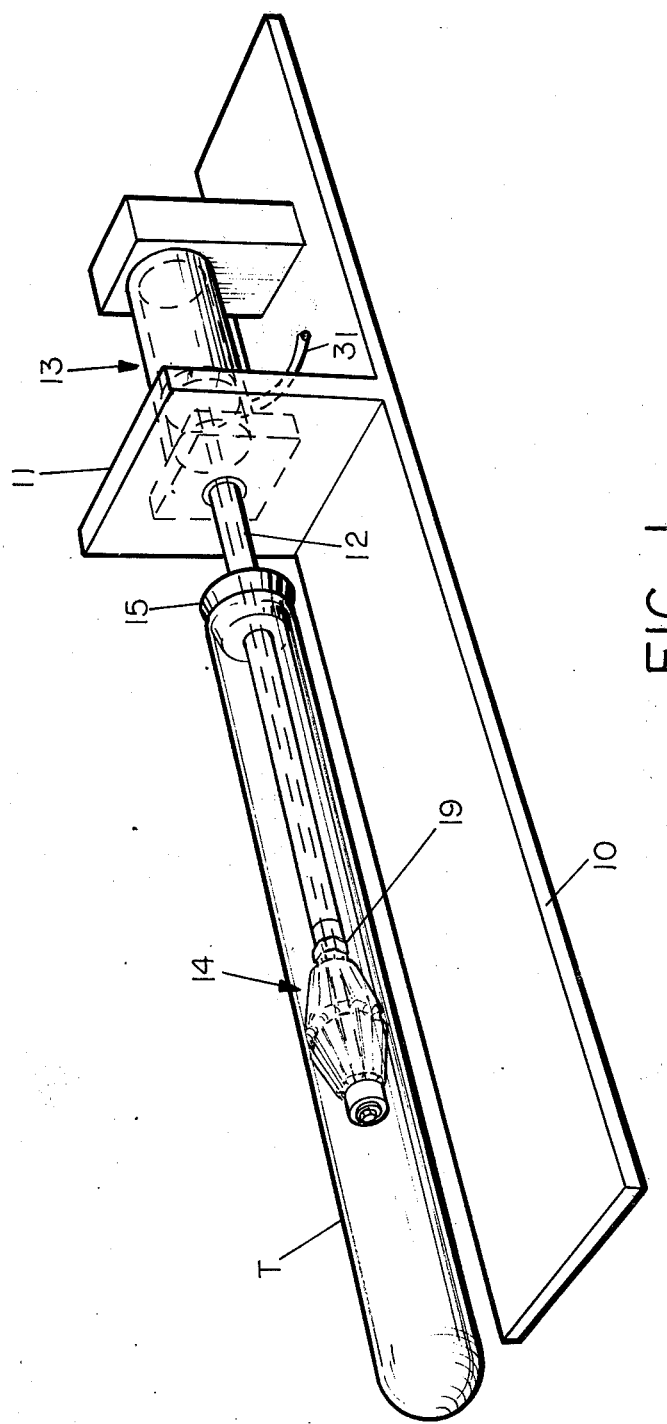
FIG. 1 is a perspective view of one embodiment of the apparatus of the invention in the environment of its use.

With particular reference to FIG. 1, there is shown a base plate 10 having a vertically extending portion 11 fixed thereto near one end thereof. To the portion 11 is mounted a horizontally extending metal tube 12. The tube may extend through the portion 11 or be fixed thereto. As shown in FIG. 1, a fluid motor 13 is fixed to, and extends to the right from the portion 11. The fluid motor is a single acting piston motor such as Model No. 0175-2009-004 manufactured by Modernair Co. The tube 12 extends horizontally from the portion 11 of the base plate 10 a distance which is preselected for the purpose intended so as to accommodate a length of closed end, glass tubing T of a particular length. At its extending end, the support tube 12 is internally threaded, and carries an externally clamping chuck generally designated 14 on the end thereof. The clamping chuck 14 will be described in detail with reference to FIGS. 2-4.

Intermediate the chuck 14 and the mounting flange or portion 11, the support tube 12 carries a frusto-conical member 15. The motor 13 is of the reciprocating piston-type having a piston rod 16 extending therefrom. The rod 16 extends coaxially through the tube 12 and through the body of the chuck 14 where its extreme end is connected by a bolt 17 to the end of the chuck 14.

Figure 2:
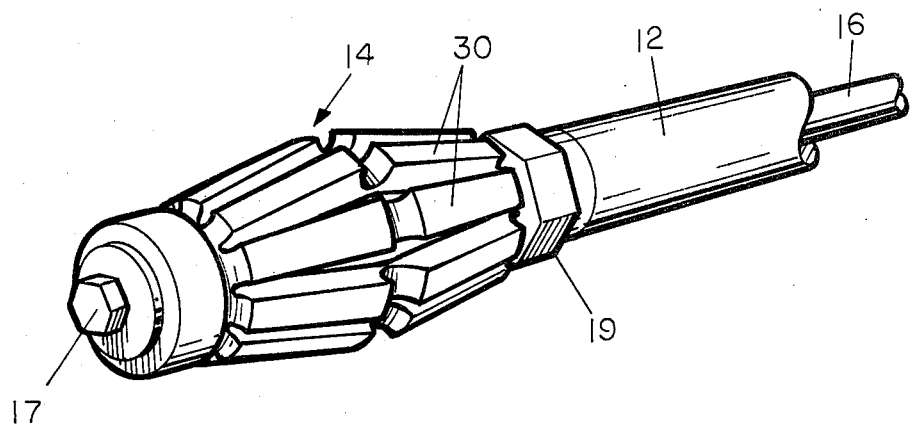
FIG. 2 is an enlarged, perspective view of the chuck portion of FIG. 1.
Figure 3:
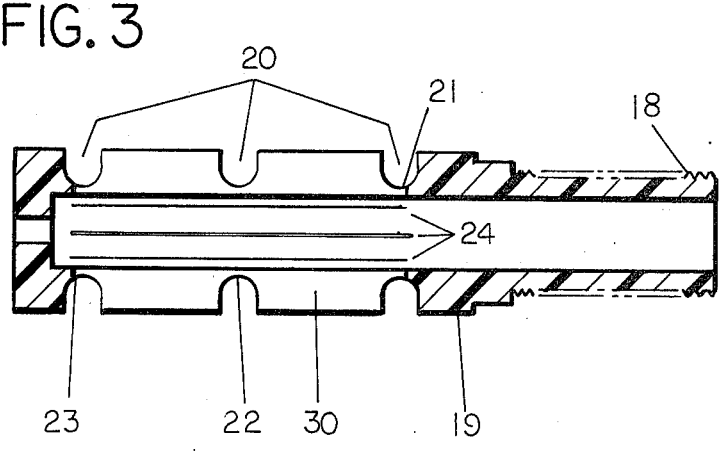
FIG. 3 is a cross-sectional view of the integral chuck member of FIG. 2.

With particular reference to FIGS. 2 and 3, the detail of the chuck 14 will be described. The chuck itself is formed of a single, cylindrical piece of polypropylene which has the property of being wear-resistant, resilient, strong, and is machinable into the desired configuration. As viewed in FIG. 3, the right-hand end of the chuck 14 is provided with external threads 18 which will cooperate with the internal threads formed in the end of tube 12. A hexagonal portion 19 formed on the chuck provides a means to tighten the threads 18 of the chuck 14 within complementary threads in the tube 12. As can perhaps best be seen in FIG. 3, the chuck 14 to the left of the threaded end 18, is provided with three axially spaced, circumferentially relieved areas 20. The relieved areas terminate just short of the central bore through the chuck 14 and thereby provide a hinge area 21 toward the right, as viewed in FIG. 3, a hinge area 22 in the middle, and a hinge area 23 in the left end of the chuck. The cylindrical portion of the chuck which extends between the two outer hinge areas 21 and 23, is formed with slits 24 which extend longitudinally between the two hinge areas 21 and 23. In this manner the central portion of the chuck 14 is slit into, for example, eight equally spaced, longitudinally extending strips 30. As previously stated, the operating rod 16 is connected by bolt 17 to the left-hand end of the chuck 14 and upon actuation of the rod 16 by movement of the rod toward the right, the chuck assumes the configuration shown in FIG. 2 and will grip internally of the cylindrical glass article in the manner illustrated in FIG. 4.

Figure 4:
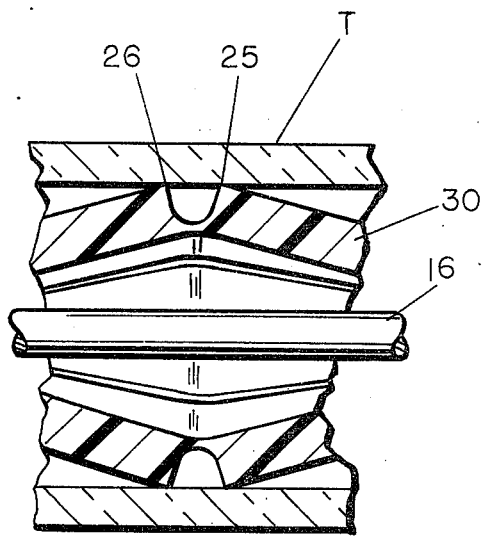
FIG. 4 is an enlarged, cross-sectional view of the chuck of FIG. 2 in its expanded form in engagement with a hollow glass article.

It can be seen by reference to FIG. 4 that the chuck engages the interior of the tubing along two circumferential lines 25 and 26, which lines are interrupted due to the slits formed through the chuck body. In this manner, however, engagement of the polypropylene chuck with the interior of the glass at these relatively widely spaced areas and with minimal actual contact, provides a system for supporting and locating the central axis of the glass article. At the same time, when the article is placed over the chuck, it is moved such that its right-hand end, as viewed in FIG. 1, will engage the conical member 15. In this manner the forward end of the glass article is also centered just prior to actuation of the motor 13 to actuate the chuck 14 with the glass article held in this position by the chuck and the cone 15. Further assembly of other glass parts may be accomplished without having to hold the central tubing with any mechanism which might mar the surface thereof.

The particular configuration of the polypropylene chuck has been found to be extremely advantageous and, in actual experimental work with the integral or, as some have expressed, "living" hinges which are provided at 21, 22 and 23, the chuck of the invention was cycled over 700,000 times without failure.

It should be pointed out that the operating rod is moved to the right by actuation of the motor 13 by air under pressure introduced through a line 31 connected to the left-hand end thereof as viewed in FIG. 1.

With reference to FIG. 5, there is shown a chuck apparatus of substantially the same configuration as shown in FIGS. 1-4. In this second embodiment of the invention, a chuck 32 is essentially identical to chuck 14. The chuck 32 is supported at the lower end of a tube 33. The tube 33 extends downwardly from a support member 34 which may be carried by a pair of rods 35. The member 34 will also support a fluid motor 36 of the same type as previously described motor 13. The motor 36 has an output rod 37 extending coaxially through the tube 33 with its lower end connected by a screw 38 to the bottom of the chuck member 32.

While the motor 36 may be of the same, single acting, type as is used in FIG. 1, it is necessary that the chuck be capable of retraction from the container. The memory built in to the polypropylene member 32 may not be sufficient, after extended use, to return the outside diameter of the deactuated chuck to a size less than the internal diameter of the container neck, or the clearance might become critical with containers of slightly smaller neck diameters. Thus the motor 36 may be a double acting motor with, for example, a fluid supply to the upper end to effect collapse of the chuck or the same may be accomplished by the inclusion of a compression spring positioned above the piston to effectively return the piston to its lowest position, as viewed in FIG. 5, when the chuck 32 would be fully elongated and ready to be retracted from the neck of the container C.

Beneath the member or plate 34, there is positioned an annular resilient stop member 39. This member may be made of plastic or rubber and is in surrounding relationship to the tube 33.

In the operation of the device shown in FIG. 5, the chuck 32 will be lowered into the neck of the container C which may be positioned on a horizontal support member 40. Upon actuation of the motor 36, the polypropylene chuck 32 will assume the configuration shown in FIG. 5. While the chuck is moving from a generally cylindrical configuration that it will normally have when not flexed to the configuration of FIG. 5, arms 41 of the chuck 32 will engage the inner shoulder area of the container and raise the container slightly until the upper rim of the finish or neck of the container will engage the stop member 39. With the container C raised and held against stop member 39, it may be moved, either for transporting to another location as desired or rotated about its axis without further operation of the chuck mechanism.

It should be understood that the chuck has an inherent resiliency or memory, such that when the air pressure to the motor is discontinued and the motor vented to atmosphere, the chuck will effectively return the piston of the motor to its pre-actuation position. In the event it is desirable to have the release of the chuck accomplished with a quick response, it would be within the purview of this invention to use a double acting motor which would be supplied with air pressure alternatively to both ends thereof. Under the present operation, it was found that the addition of such other lines and connections to make the motor double acting was not necessary and the added expense unjustified, since the memory of the polypropylene material was sufficient to assure adequate retraction of the chuck following the slitting off of air to the pressure inlet line.

I claim:

1. An internal chuck for hollow glass articles comprising:
   an elongated rod;
   a reciprocating motor;
   means connecting the output of said motor to said rod;
   an elongated, rigid tube telescopically positioned over said rod;
   means mounting said motor to one end of said tube;
   an elongated, integral, hollow plastic member having a threaded portion at one end thereof;
   said threaded end of said member being threaded into the other end of said tube;
   means connecting the other end of said plastic member to the end of said rod;
   said member being outwardly deflectable upon relative movement of said rod and tube upon actuation of said motor, whereby said member will grip the interior of a glass article within which it is positioned.

2. The apparatus of claim 1 wherein said plastic member is formed of polypropylene.

3. The apparatus of claim 1 wherein said elongated, hollow plastic member has a central bore therethrough of a substantially constant diameter, and a plurality of circumferentially spaced, longitudinal slits extending through said plastic member intermediate the ends thereof.

4. The apparatus of claim 3 wherein the external surface of said member has three axially spaced, circumferentially relieved areas extending radially toward the bore therein but terminating short thereof to thereby provide two spaced hinge areas with a third hinge area intermediate the two.

5. The apparatus of claim 4 in which said third hinge area when flexed outwardly by relative movement toward each other of the ends of said member presents two interrupted lines of gripping surfaces adjacent said third hinge.

* * * * *